US010642471B2

(12) United States Patent
Robertson et al.

(10) Patent No.: US 10,642,471 B2
(45) Date of Patent: May 5, 2020

(54) DUAL TIMELINE

(71) Applicant: Oracle International Corporation, Redwood Shores, CA (US)

(72) Inventors: Mark Robertson, San Diego, CA (US); Chadwick Chow, Lexington, MA (US); Jay Turner, Holliston, MA (US); Hendrik van den Broek, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/532,939

(22) Filed: Nov. 4, 2014

(65) Prior Publication Data

US 2015/0379097 A1    Dec. 31, 2015

Related U.S. Application Data

(60) Provisional application No. 62/017,215, filed on Jun. 25, 2014.

(51) Int. Cl.
| | |
|---|---|
| *G06F 3/0485* | (2013.01) |
| *G06F 16/26* | (2019.01) |
| *G06F 3/0484* | (2013.01) |
| *G06Q 10/10* | (2012.01) |

(52) U.S. Cl.
CPC ........ *G06F 3/0485* (2013.01); *G06F 3/04847* (2013.01); *G06F 3/04855* (2013.01); *G06F 16/26* (2019.01); *G06F 3/04842* (2013.01); *G06F 2203/04803* (2013.01); *G06Q 10/109* (2013.01)

(58) Field of Classification Search
CPC .. G06F 3/0484–04885; G06F 3/0487–048865; G06Q 10/103; G06Q 10/109–1097
See application file for complete search history.

(56) References Cited

U.S. PATENT DOCUMENTS

| | | | |
|---|---|---|---|
| 7,944,445 B1* | 5/2011 | Schorr | G06F 3/0486 345/440 |
| 2006/0156246 A1* | 7/2006 | Williams | G06F 16/58 715/764 |
| 2008/0126979 A1* | 5/2008 | Abe | G06F 16/51 715/781 |
| 2009/0177998 A1* | 7/2009 | Barrios | G06F 3/04855 715/799 |

(Continued)

*Primary Examiner* — Matthew Ell
*Assistant Examiner* — Linda Huynh
(74) *Attorney, Agent, or Firm* — Trellis IP Law Group, PC (57) ABSTRACT

Dual timeline visualizations include a detail timescale shown along two item regions. Display objects shown in an item region may represent events, activities, or multiple stacked events and activities from a set of chronological data items. Display objects have positions and sizes representing those of the corresponding events and activities, and may include data-related or user-selected colors and/or hashing. The detail timescale, in unison with the item regions, may be scrollable and resizable in the direction of time. The item regions may be separately scrollable and resizable in another direction. A visualization may also include an overview panel representing a summary view of both sets of chronological data items, with its own timescale, and a lens showing the position of the detail timescale and item regions.

16 Claims, 8 Drawing Sheets

(56) References Cited

U.S. PATENT DOCUMENTS

| | | | |
|---|---|---|---|
| 2009/0276724 A1* | 11/2009 | Rosenthal | G06F 3/0482 715/771 |
| 2009/0287685 A1* | 11/2009 | Charnock | G06F 16/38 |
| 2011/0035700 A1* | 2/2011 | Meaney | G06F 3/048 715/784 |
| 2012/0173985 A1* | 7/2012 | Peppel | G06F 3/0484 715/730 |
| 2013/0086501 A1* | 4/2013 | Chow | G06F 16/2477 715/772 |
| 2013/0159198 A1* | 6/2013 | Cartan | G06Q 10/06 705/301 |
| 2014/0240320 A1* | 8/2014 | Malik | G06Q 10/06313 345/440 |

* cited by examiner

DUAL TIMELINE

CROSS REFERENCES TO RELATED APPLICATIONS

This application claims priority from U.S. Provisional Patent Application Ser. No. 62/017,215, entitled DUAL TIMELINE, filed on Jun. 25, 2014, which is hereby incorporated by reference herein for all purposes.

BACKGROUND

This application relates to the field of user interfaces, and in particular to user interfaces and data visualizations for viewing events or other information in chronological order.

Timelines provide a way to present data in chronological order. A typical timeline visualization includes a display area with display objects representing events plotted along a timescale. Prior timeline visualizations work very well for displaying events for one entity, such as the biography of a person. However, these prior timeline visualizations are poorly suited for displaying and comparing two or more different sets of chronologically-ordered data. For example, using a prior timeline visualization to compare the biographies of two different people results in a cluttered and confusing presentation in which it is difficult to contrast between the events in each person's life.

Another problem of prior timeline visualizations is that they do not offer a way to compare anything but milestones. For instance, there has been no method to visualize and compare processes in which activities may have a duration.

A problem of prior visualizations on small screens, such as on mobile devices, is that displaying many subsequent activities leads to the need for an extremely wide screen, or the loss of detail. Many concurrent activities leads to the need for an extremely tall screen, or again the loss of detail.

A further problem is that a user may want to vary the amount of detail visible versus the available screen space. This need has previously only been met by providing zooming controls. However, zooming back and forth can be tedious.

There is an unmet need to solve the general problems of prior visualizations and to provide a way to present timelines suitable for process comparison even on a display of limited dimensions.

SUMMARY

Embodiments of the invention include a dual timeline visualization with a timescale indicator (the detail timescale) shown along first and second item regions. The first and second item regions show display objects representing first and second sets of chronological data items. In an embodiment, a display object may visually represent a time value and a duration value of its associated chronological data item. In a further embodiment, the first and second item regions and the detail timescale may scroll and resize in unison in the direction aligned with the detail timescale's time axis. In an additional embodiment, the first and second item regions may scroll independently in directions not aligned with the detail timescale's time axis. In still a further embodiment, the dual timeline visualization may include an overview panel representing a summary view of both sets of chronological data items and a visual indication of the location of the first and second item regions with respect to the entire first and second sets of chronological data items.

Embodiments of the invention provide a method of generating a timeline visualization for comparing two datasets of chronologically ordered data. The first step of the method is retrieving a first and a second dataset from a data storage system, wherein the first dataset includes at least a first data item associated with a first time value and a first duration value and the second dataset includes at least a second data item associated with a second time value.

Further steps of the method include generating a detail timescale and first and second item regions aligned with the detail timescale. The detail timescale displays time units in a first direction.

The method further includes the step of generating for display in the first item region a first display object, which corresponds with the first data item, and generating for display in the second item region a second display object, which corresponds with the second data item. Positioning of the first and second display objects with respect to the detail timescale is based on the first and second time values. The first display object includes a size based on the first duration value. A duration value may be zero if a data item represents an event, and larger than zero if it represents an activity.

The method further includes forwarding the detail timescale, item regions and display objects to a user device that is capable of displaying the timeline visualization.

Embodiments of the invention may align the detail timescale horizontally, vertically, in depth, or in any other first direction. The item regions are aligned with the detail timescale in this first direction.

The detail timescale, and in unison with it the item regions, may be scrollable and resizable in the first direction. The item regions may be jointly or separately scrollable and resizable in a second direction.

In embodiments of the invention, a display object may include a color or hashing based on information included in its data item or data set, or that is set by the user.

Embodiments of the invention may further comprise generating for display an overview panel, including an overview timescale different than the detail timescale, and generating markers to be displayed on the overview panel. Marker positions and sizes are based on time values and duration values of corresponding data items. A portion of the overview panel, corresponding with the time and duration of the detail timescale and item regions, may be highlighted.

Further embodiments of the invention may include stacking multiple overlapping data items in a single display object with visual indicators to show that it represents multiple data items, and unstacking multiple stacked data items by reducing the contrast of the displayed background and overlaying it with a row, column, or array of display objects representing individual data items. The row, column, or array may be scrollable.

A further understanding of the nature and the advantages of particular embodiments disclosed herein may be realized by reference of the remaining portions of the specification and the attached drawings.

BRIEF DESCRIPTION OF THE DRAWINGS

The invention will be described with reference to the drawings, in which.

DESCRIPTION

Timeline visualizations provide a way to present data in chronological order on a display area. The data may represent any chronologically ordered process or series of items—hereafter called data items.

A typical timeline visualization includes an item region along a (detail) timescale. The item region may include display objects representing data items—both for milestones (events with zero duration) and activities (processes with non-zero duration). Embodiments of the invention include dual item regions along a detail timescale, to enable easy comparison of two sets of chronological data. They may further include an overview panel with an overview timescale, and further innovations to allow for comparing datasets even on a small screen.

Figure 1:
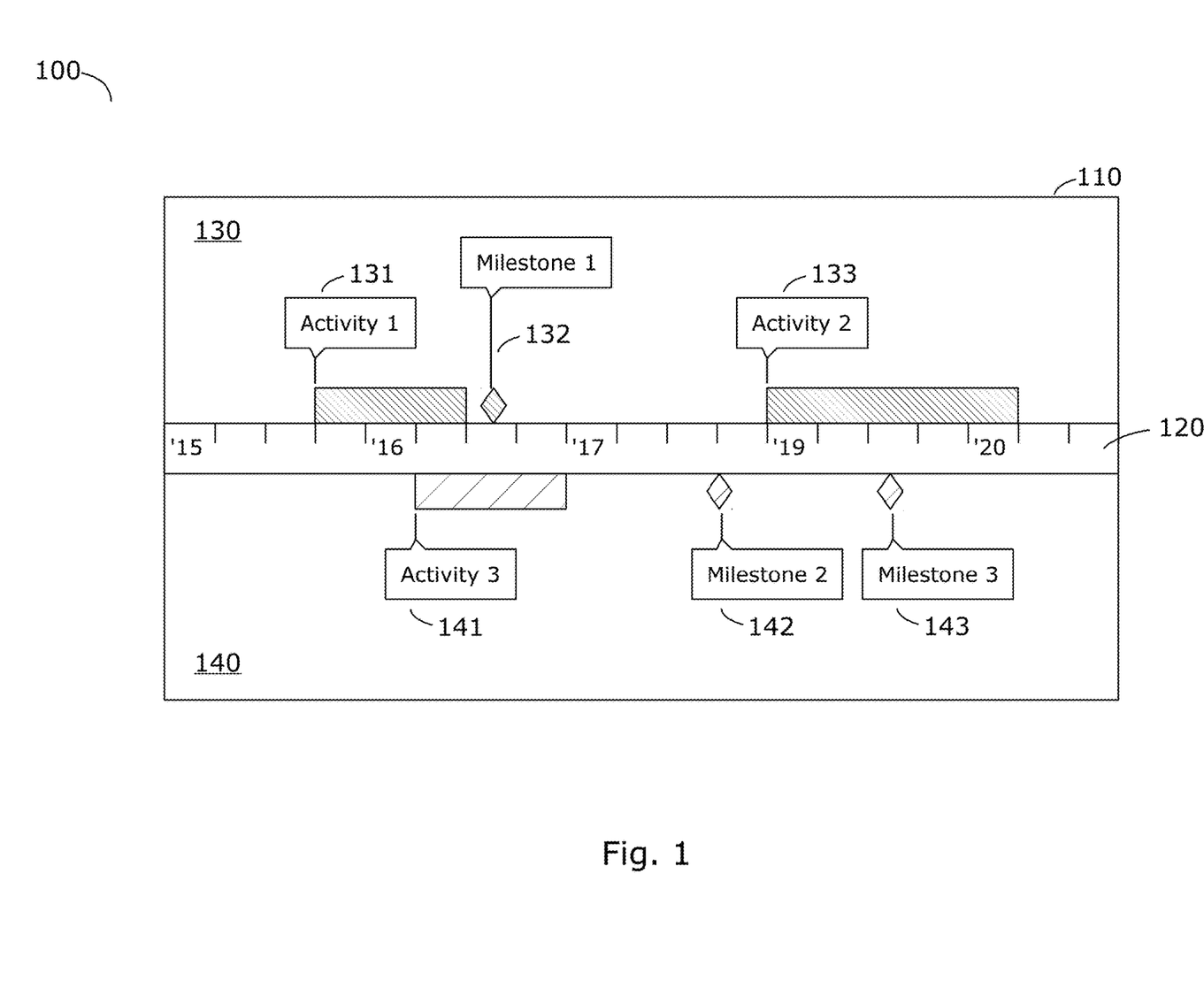
FIG. 1 illustrates a dual timeline suitable for comparing two datasets each having activities and milestones according to an embodiment of the invention.

FIG. 1 illustrates a dual timeline visualization 100 suitable for comparing two datasets each having activities and milestones according to an embodiment of the invention. The visualization 100 is outlined by a component container border 110, and includes a first item region 130, a common detail timescale 120, and a second item region 140. This visualization 100 is a horizontal embodiment, meaning that time progresses along a horizontal axis as illustrated by detail timescale 120. Other embodiments may use another direction for time, such as vertical, or depth. While in this embodiment the detail timescale 120 is common to the item regions 130 and 140, alternative embodiments may include separate and independent detail timescales for each of the item regions, allowing for comparison of two projects that are not concurrent in time, or that may span different durations, or both. Yet other embodiments may include more than two item regions for comparing more than two datasets, and more than two separate and independent detail timescales. Further embodiments may include additional types of data items other than those representing just activities and milestones.

In the example embodiment of the invention illustrated in FIG. 1, item region 130 includes display objects 131 and 133 representing activities and display object 132 representing a milestone. Activity 131 could, for instance, be represented by a line or a bar. Milestone 132 could, for instance, be represented by a dot or a diamond. Or embodiments could represent any of the project items 131-133 by a more complex display object, which may include callouts, boxes with informative shapes, text labels, hypertexts, icons or images, context popups, buttons, and any other controls commonly used in graphical user interfaces. Embodiments could visualize display objects with color coding, hashing, texture, shading, highlighting, or lowlighting to reveal underlying data item information or to reflect user interaction or customization.

In this embodiment of the invention, Activity 1 is represented by display object 131 that includes a hashed bar, or bar with a first color, and a callout. The hashed bar is aligned along detail timescale 120. The beginning of the hashed bar is aligned with the time of the start of Activity 1 and the end of the hashed bar is aligned with the time of the end of Activity 1. Therefore, the length of the bar is proportional with the duration of Activity 1. However, proportionality may get lost for very short activities, since a bar may need to be displayed with a minimum width, for instance a minimum number of pixels. The callout in display object 131 includes the name of the activity: Activity 1.

Further, in this embodiment of the invention, Milestone 1 is represented by display object 132 that includes a hashed diamond, or diamond with the first color, and a callout. The diamond is aligned along detail timescale 120. Since a milestone has zero duration, only one point, in this case the bottom point of the diamond, is aligned with the time of the occurrence of Milestone 1. The callout in display object 132 includes the name of the milestone: Milestone 1.

Again in the example embodiment of the invention illustrated in FIG. 1, item region 140 includes display objects representing activity 141 and milestones 142-143. Bars and diamonds in item region 140 may have a different hashing than those in item region 130, or a second color.

Project items 131-133 may represent data items from a first dataset, while project items 141-143 may represent data items from a second dataset. Although FIG. 1 shows an example visualization of two datasets, there is no limit in the number of datasets. Embodiments of the invention could show additional datasets in additional item regions, simultaneously, or upon user interaction, replacing one or more of the item regions previously shown. Datasets may be included in simple files, in databases, or in other arrangements of data that can be stored in memories or computer-readable tangible media.

The difference in hashing or color coding, or both, of display objects may simply represent that display objects represent data items from different datasets. Or the color or hashing of a display object could represent some property contained in a data item, or a customization initiated by the visualization user. Similarly, the background color of an item region may be color-coded.

Figure 2:
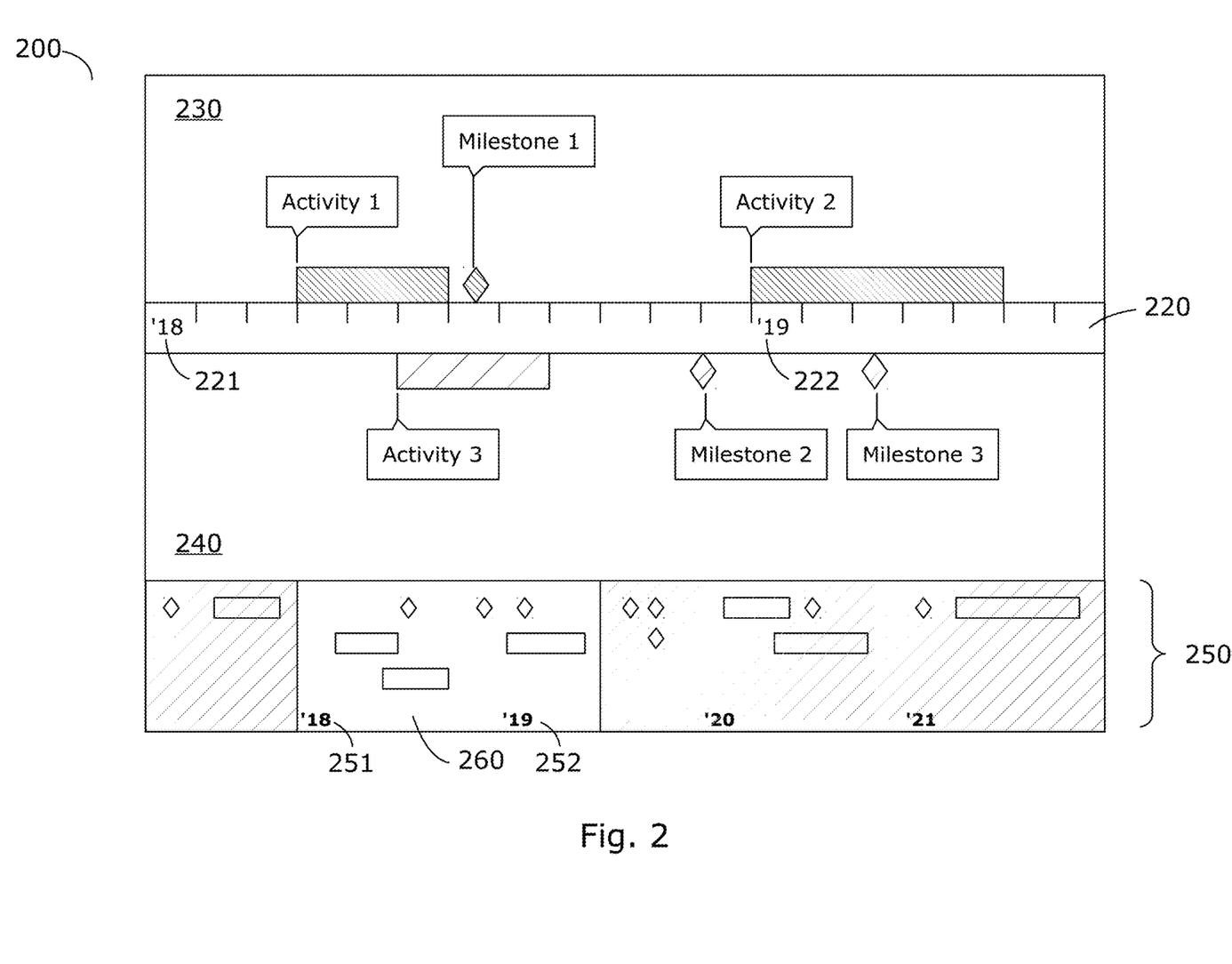
FIG. 2 illustrates a dual timeline with an overview panel according to an embodiment of the invention.

FIG. 2 illustrates a dual timeline visualization 200 with an overview panel 250 according to an embodiment of the invention. In this horizontal visualization 200, the overview panel 250 stretches from the left to the right. Overview panel 250 may include an implicit or explicit overview timescale, which may be different (typically having a longer duration) than the detail timescale. Embodiments of the invention may highlight part 260 of overview panel 250, a "lens", to indicate which part of the overview corresponds to the detail timescale duration and is shown in detail in the item regions 230 and 240. Time unit labels 251 and 252 of the overview timescale, showing inside lens 260, correspond to time unit labels 221 and 222 of the detail timescale, respectively.

To save screen space, embodiments of the invention may represent data items in the overview panel 250 with very little detail, for instance by limiting representations to lines and dots, or bars and diamonds. Such data item representations in the overview panel 250 are denoted markers in the context of this document. The overview panel 250 has no need for detail, as long as the lens 260 can be moved along the overview panel 250, and decreased or enlarged to show the right level of detail in the item regions 230 and 240.

Although the embodiment of the invention illustrated in FIG. 2 collapses both (or multiple) datasets in a single overview panel 250 with a single overview timescale, other embodiments may visually separate different datasets, for instance by differently color coding the markers or their background, or for instance by showing multiple parallel overview panels and their common or separate overview timescale(s).

Figure 3:
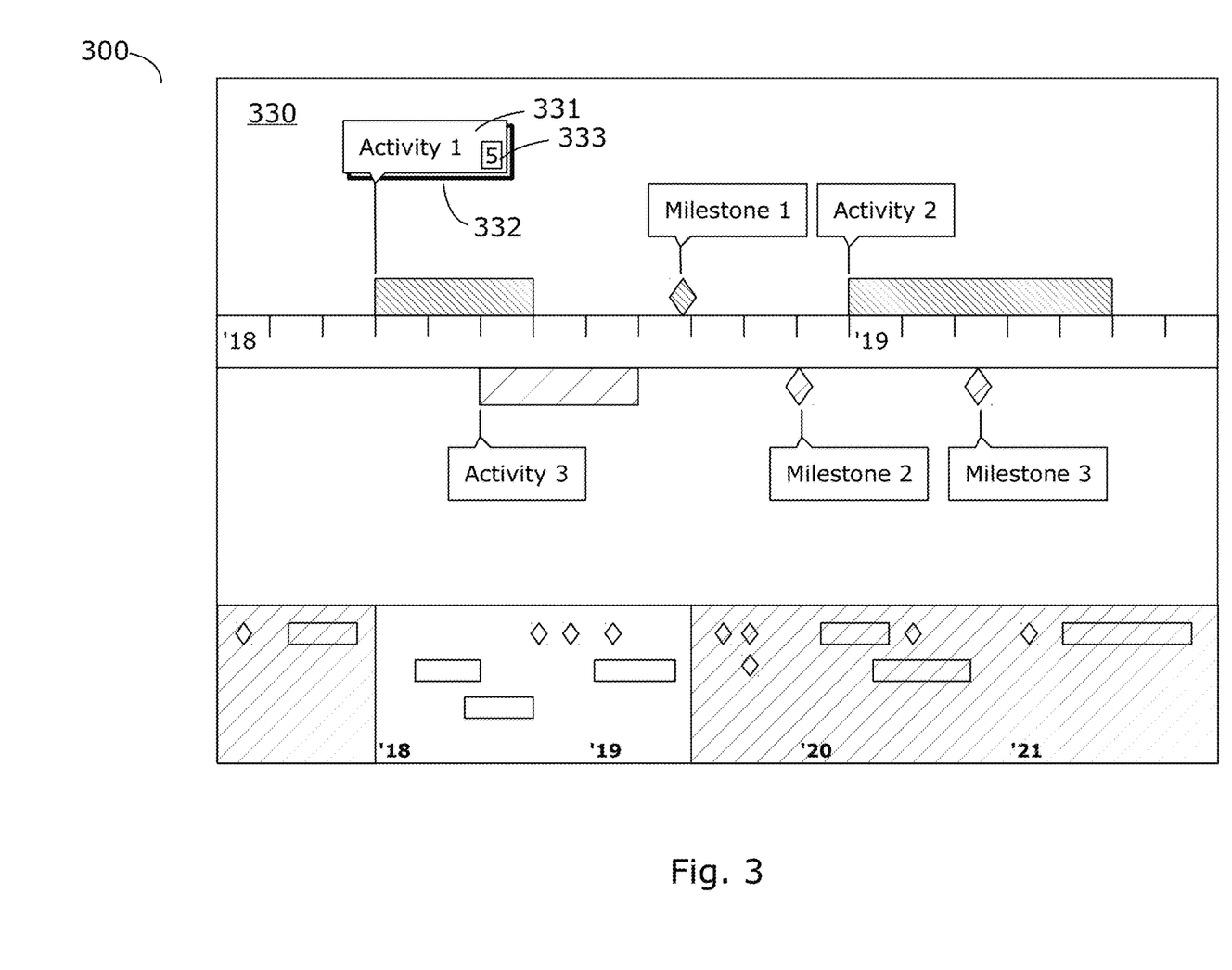
FIG. 3 illustrates stacking multiple concurrent data items in an item region according to an embodiment of the invention.

FIG. 3 illustrates stacking multiple concurrent data items in an item region 330 according to an embodiment 300 of the invention. To save screen space, this embodiment stacks multiple fully or partially overlapping data items, which could include both activities, milestones, and other types of data items, and represents those as a single display object 331. The embodiment provides visual coding of the display object 331 to show it represents multiple data items, in this case by providing background shading 332. It may also provide a numerical indicator 333 to show how many data items the display object 331 represents.

Figure 4:
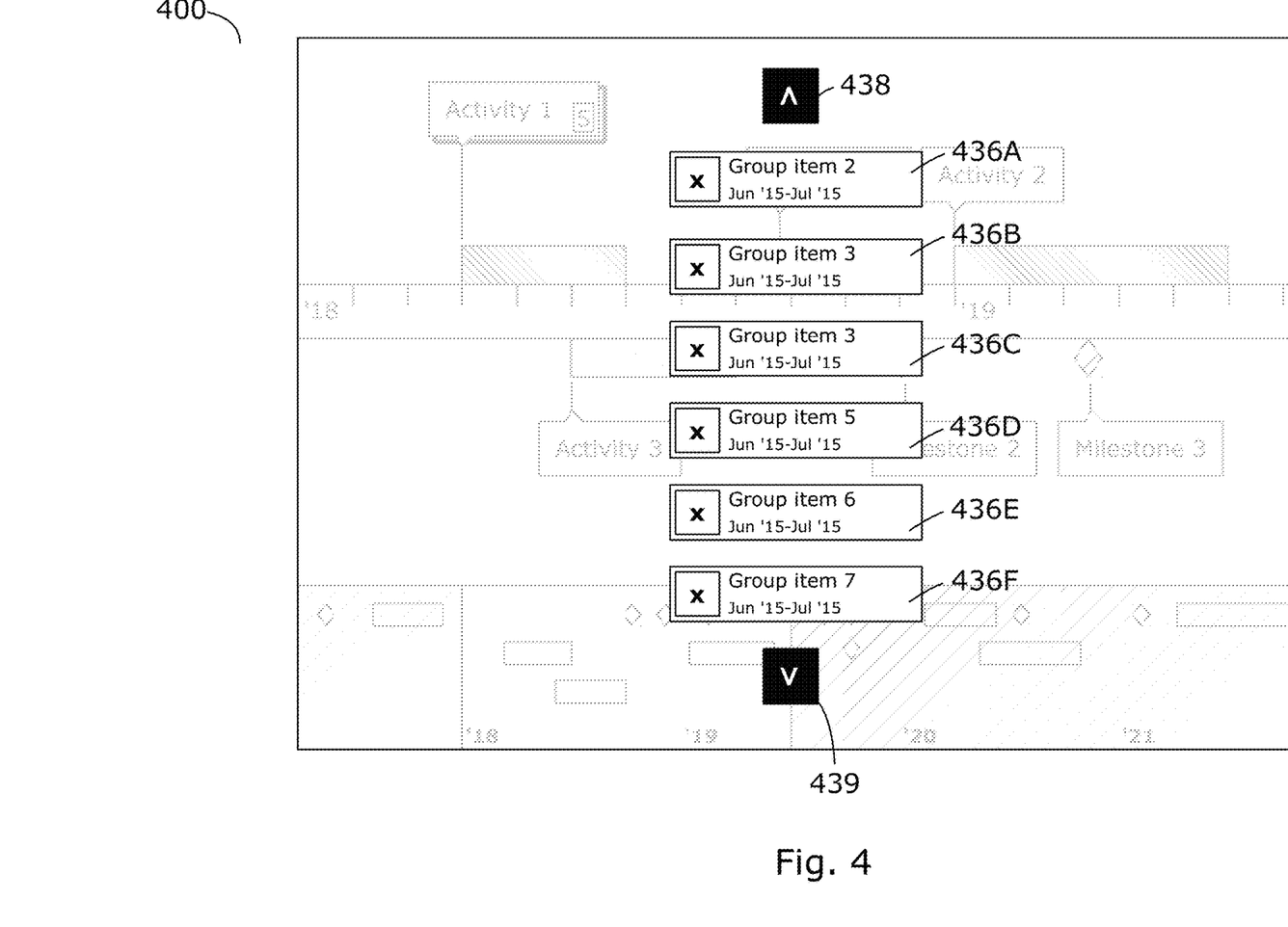
FIG. 4 illustrates unstacking multiple concurrent data items according to an embodiment of the invention.

FIG. 4 illustrates unstacking multiple concurrent data items 436A-F according to an embodiment 400 of the invention. In response to a user input event, such as tapping, double-tapping, clicking, right-clicking, double-clicking, the embodiment may lowlight (i.e., reduce contrast for) parts or all of the previously showing elements contained in the visualization, and overlay those with a column, row, or array of highlighted display objects 436A-F representing part or all of the relevant data items. In case not all data items are represented, the embodiment could provide scroll buttons, such as vertical scroll buttons 438 and 439 to allow the user to navigate to any of the data items that are still stacked. Alternatively, an embodiment may provide other visual clues, such as stacked display objects at the top and at the bottom, or partially shown display objects, and it could respond to user swipe or mouse scroll events.

Figure 5:
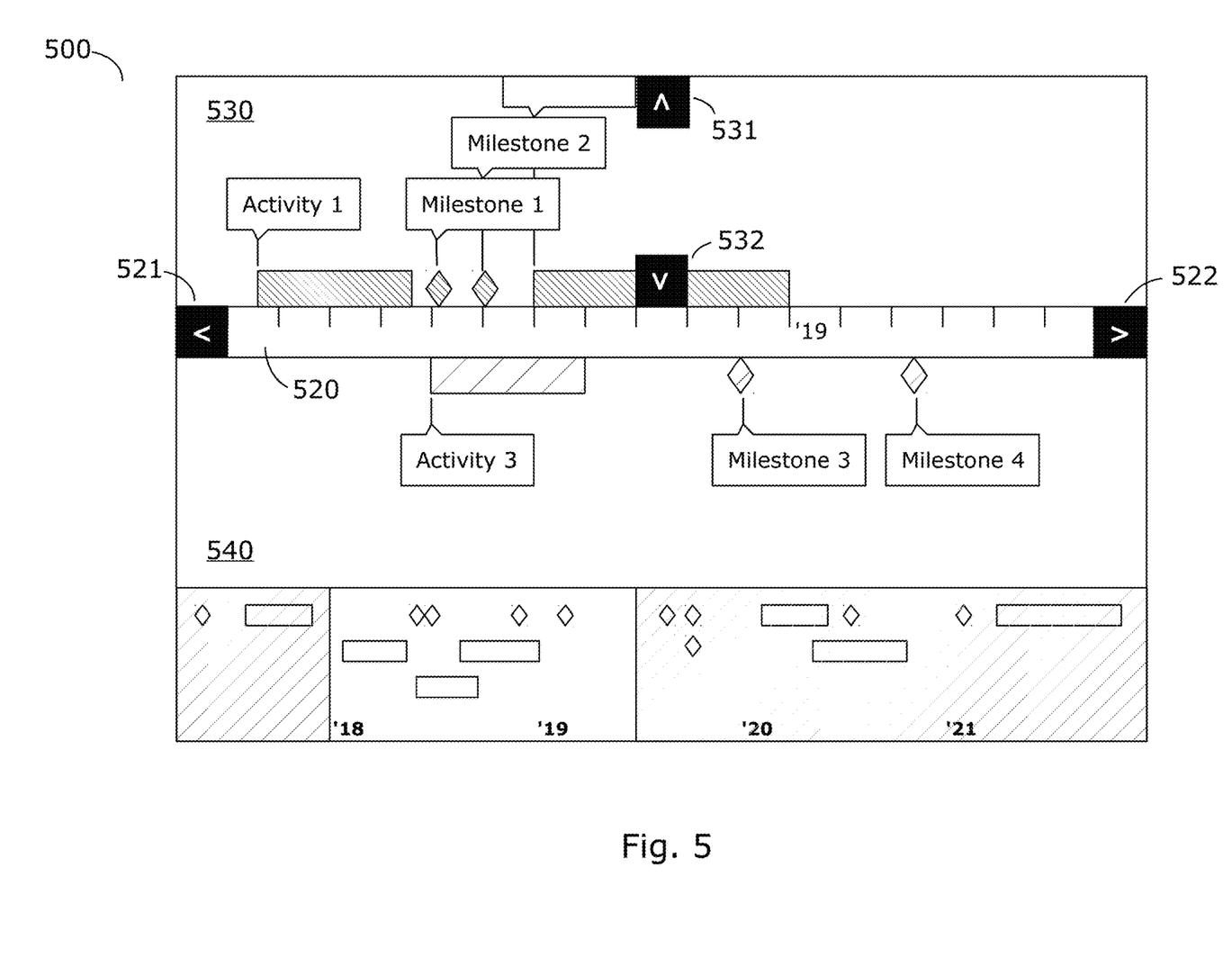
FIG. 5 illustrates controls for scrolling and resizing the detail timescale and for scrolling and resizing an item region according to an embodiment of the invention.

FIG. 5 illustrates controls 521 and 522 for scrolling and resizing the detail timescale 520 and controls 531 and 532 for scrolling and resizing item region 530 according to an embodiment 500 of the invention. This embodiment provides a user visual clues of being scrollable by showing horizontal scroll controls 521 and 522, and vertical scroll controls 531 and 532. It provides further visual clues that it is vertically scrollable by partially showing display objects running vertically out of item region 530.

In this embodiment, a user may, for example, trigger a detail timescale 520 scroll event by tapping or clicking left scroll button 521 to display events starting and ending at earlier dates, or by tapping or clicking right scroll button 522 to display events starting and ending at later dates. A user could increase the detail timescale 520 by tapping both buttons 521 and 522 simultaneously. Scrolling and/or resizing of the detail timescale will result in scrolling and/or resizing of the associated item region(s) in unison, in this case of both item regions 530 and 540.

In embodiment 500, item region 530 may be scrolled vertically, and independent of or in unison with item region 540, in response to tap or click events on vertical scroll buttons 531 and 532. Item region 530 may be vertically expanded by simultaneously tapping scroll buttons 531 and 532. This results in lowering the position of the detail timescale and decreasing the vertical size of item region 540 and/or the overview panel. The embodiment may compress item region 530 in response to the user performing a similar expansion input on item region 540.

Embodiments using a touchscreen display may omit buttons 521, 522, 531, and 532 and respond to touchscreen input gestures, such as user swipe events on the detail timescale 520 or in the item regions 530 and 540 to move its start and end dates, and user pinch events and user spread events to compress or expand the detail timescale 520. Embodiments may simultaneously respond to events impacting scroll and resizing of the detail timescale 520. For instance, in response to a left-pinch event (right finger stationary while left finger moves closer), an embodiment may keep the end date unchanged while compressing the detail timescale 520, resulting in an earlier shown start date. In general, any user input triggering a scroll and/or resize in the direction of time, whether performed on timescale 520, item region 530, or item region 540, may result in scrolling and/or resizing of each timescale 520 and item regions 530 and 540 in unison.

Further embodiments of the invention may respond similarly on user input events occurring at the overview panel and at the lens. Scrolling and resizing performed on the lens may result in simultaneous changes in the item regions and detail timescale, whereas scrolling and resizing of the overview panel outside of the lens may impact the overview panel independent of the lens, item regions, and detail timescale.

Figure 6:
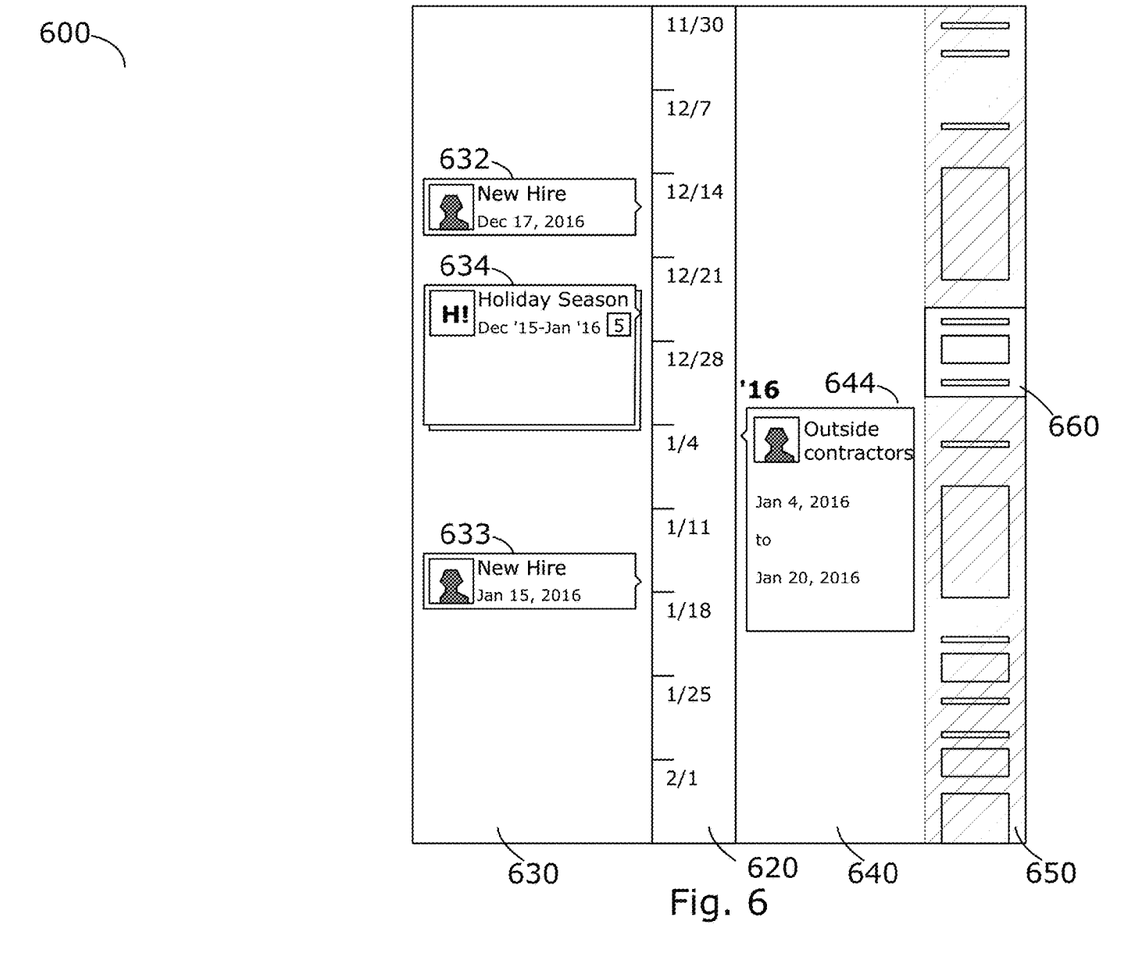
FIG. 6 illustrates a vertical view of a timeline visualization according to an embodiment of the invention.

FIG. 6 illustrates a vertical view 600 of a timeline visualization according to an embodiment of the invention. This example vertical visualization includes detail timescale 620, first item region 630, second item region 640, overview panel 650 and lens 660. The embodiment may show this visualization in response to a user changing the orientation of a mobile device from horizontal (landscape) to vertical (portrait mode). This vertical visualization offers a user a different level of detail than a horizontal visualization. Hence, a user may control the amount of detail shown by simply changing the orientation of the mobile device rather than using various zoom or resize methods. Alternatively or additionally, embodiments of the invention could show this view as the result of a user preference setting, a device setting, a system setting, or a file or database setting.

In this example embodiment, first item region 630 includes display objects 632 and 633 each representing a milestone, and a display object 634 representing 5 stacked data items, at least one of which ("Holiday Season") represents an activity, having a duration greater than zero. Similarly, second item region 640 includes display object 644 for another activity.

Further in this example embodiment, FIG. 6 shows an overview panel 650 with markers that represent only collapsed data items of a first dataset, linked with the first item region. It hides data items of a second dataset, linked with the second item region. In response to modified settings, or user input, the embodiment may expand collapsed overlapping activities and events in the overview panel, and/or it may show markers related to both datasets.

Figure 7:
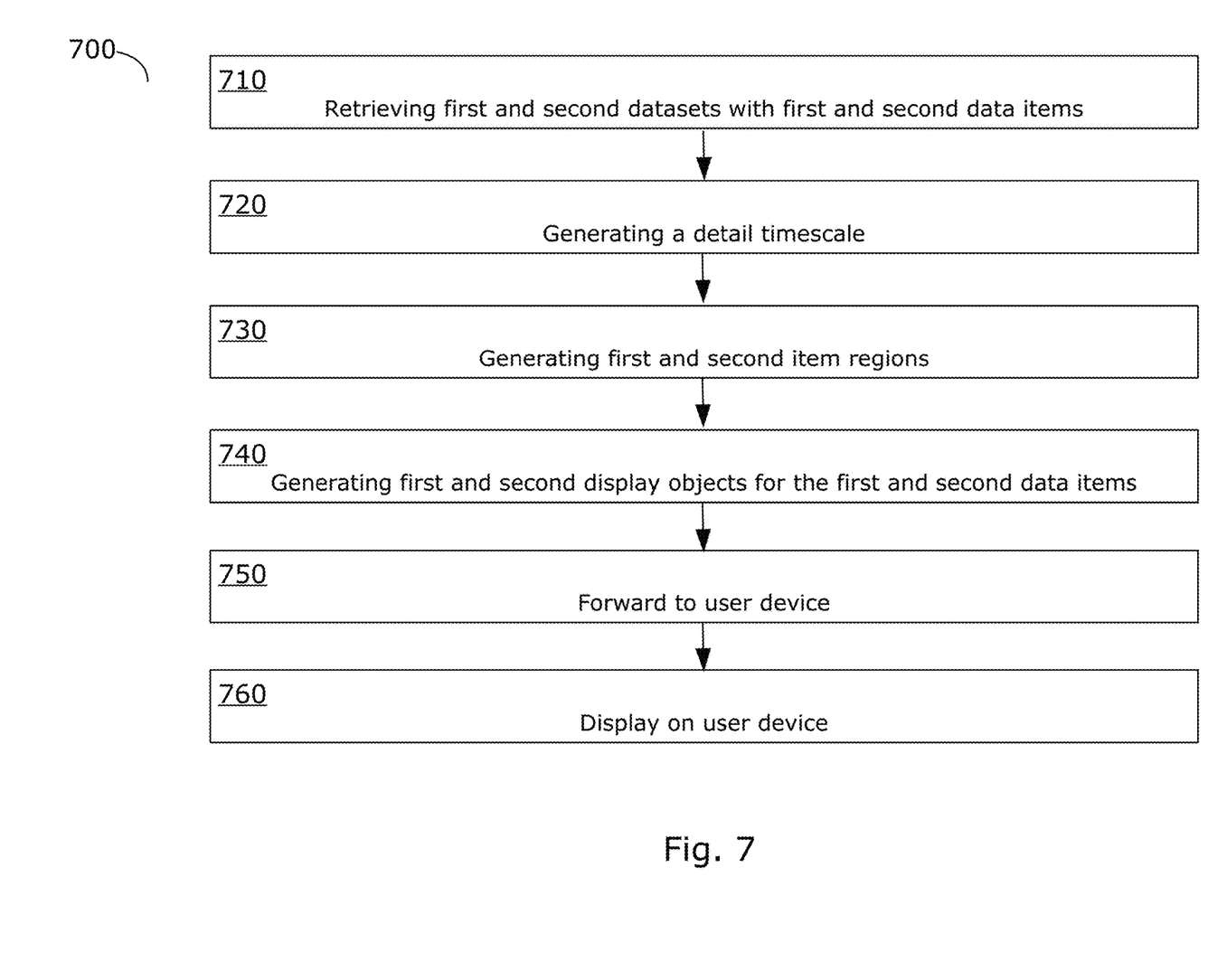
FIG. 7 illustrates a method for generating a timeline visualization for comparing two datasets of chronologically ordered data according to an embodiment of the invention.

FIG. 7 illustrates a method 700 for generating a timeline visualization for comparing two datasets of chronologically ordered data according to an embodiment of the invention. The method comprises the following steps.

Step 710—retrieving first and second datasets from a data storage system, wherein the first dataset includes at least a first data item associated with a first time value and a first duration value and the second data set includes at least a second data item associated with a second time value.

Step 720—generating for display a detail timescale including at least the first time value.

Step 730—generating for display a first item region, wherein the first item region is aligned with the detail timescale; and generating for display a second item region, wherein the second item region is aligned with the detail timescale.

Step 740—generating for display in the first item region a first display object corresponding with the first data item, wherein a first display object position with respect to the detail timescale is based on the first time value and wherein the first display object has a size based on the first duration value; and generating for display in the second item region a second display object corresponding with the second data item, wherein a second display object position with respect to the detail timescale is based on the second time value.

Step 750—forwarding to a user device adapted to display the timeline visualization: the detail timescale, the first and second item regions, and the first and second display objects.

Step 760—on the user device, displaying at least partially each: the detail timescale, the first and second item regions, and the first and second display objects.

Figure 8:
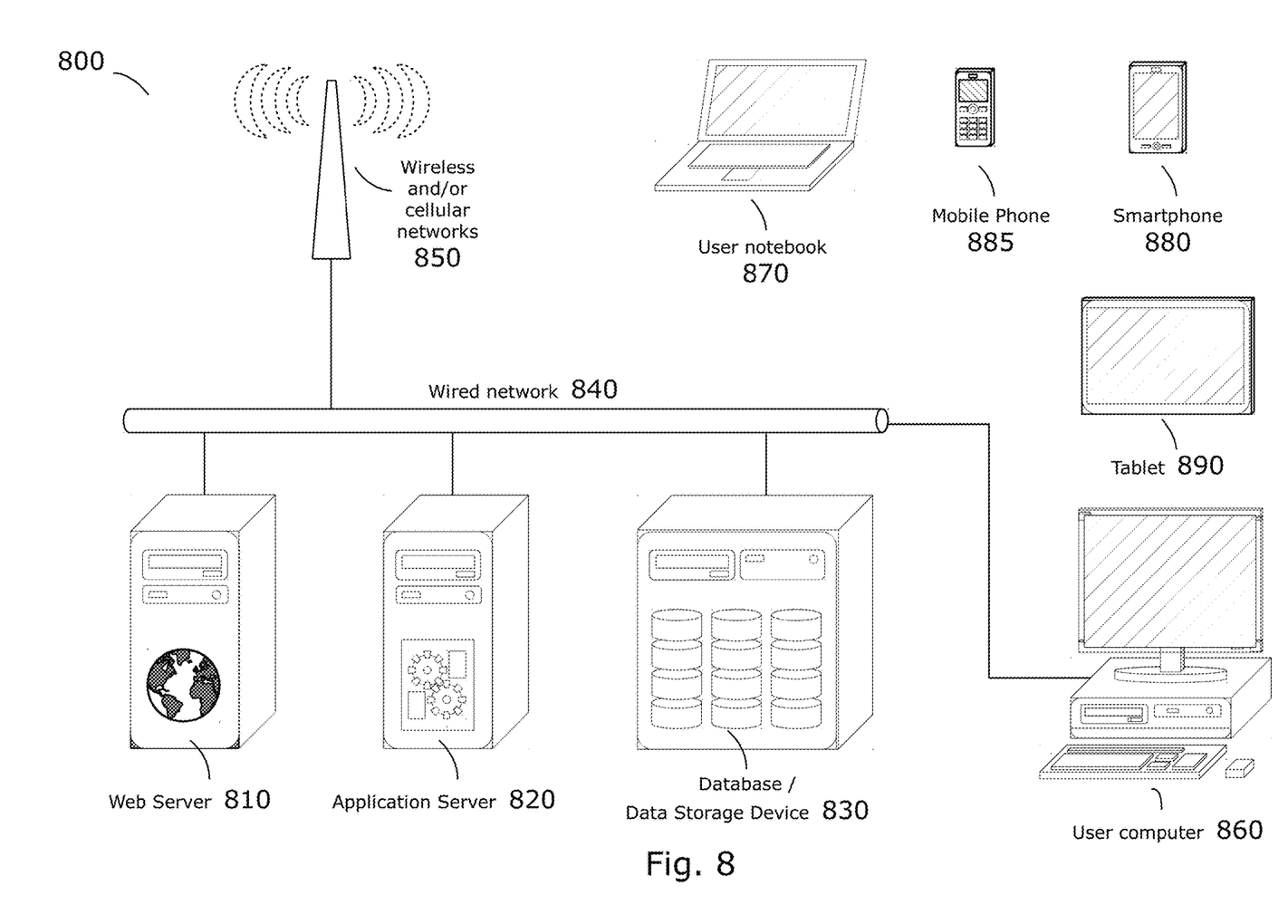
FIG. 8 illustrates an example system capable of displaying embodiments of the invention.

FIG. 8 illustrates an example system 800 suitable for implementing embodiments of the invention. Embodiments of the invention may be implemented as standalone applications or as web-based applications implemented using a combination of client-side and server-side code. The system includes user devices 860-890 including desktop computers 860, portable personal computers 870, smartphones 880, mobile phones 885, and tablets 890. The system can interface with multiple types of user devices, such as a thin-client computer, Internet-enabled mobile telephone, tablet, electronic book reader, mobile Internet access device, or personal digital assistant, capable of displaying and navigating web pages or other types of electronic documents and/or executing applications. Although the system 800 is shown with five user devices, any number of user devices can be supported.

A web server 810 is used to process requests from web browsers and standalone applications for web pages, electronic documents, enterprise data or other content, and other data from the user computers. The server may also provide push data or syndicated content, such as RSS feeds, of data related to enterprise operations.

Application server 820 operates one or more applications. The applications can be implemented as one or more scripts or programs written in any programming language, such as Java, C, C++, C#, or any scripting language, such as JavaScript or ECMAScript, Perl, PHP, Python, Ruby, or TCL. Applications can be built using libraries or application frameworks, such as Rails, Enterprise JavaBeans, or .NET. Web content can be created using HTML, CSS, and other web technology, including template languages and parsers.

The data applications on application server 820 process input data and user device requests and can store or retrieve data from a database on data storage device 830. Data storage device 830 stores data created and used by the data applications. In an embodiment, the data storage device 830 includes a relational database that is adapted to store, update, and retrieve data in response to SQL format commands or other database query languages. In other embodiments, unstructured data storage architectures and NoSQL databases may also be used.

In an embodiment, the application server 810 includes a computer capable of executing programs or scripts. In an embodiment, the web server 810 is implemented as an application running on a computer capable of executing programs or scripts. The web server and application server may be combined and executed on the same computers.

An electronic communication network enables communication between user computers 860-890, web server 810, application server 820, and data storage device 830. In an embodiment, the network may include any form of electrical or optical communication devices, including wireless 850 and wired 840 networks. Network 840/850 may also incorporate one or more local-area networks, such as an Ethernet network; wide-area networks, such as the Internet and cellular carrier data networks; and virtual networks, such as a virtual private network.

The system is one example for executing applications according to an embodiment of the invention. In another embodiment, application server, web server, and optionally database can be combined into a single server computer application and system. In a further embodiment, virtualization and virtual machine applications may be used to implement one or more of the application server, web server, and database. In still further embodiments, all or a portion of the web server and application functions may be integrated into an application running on each of the user computers. For example, a JavaScript application on the user computer may be used to retrieve or analyze data and display portions of the applications.

Although the description has been described with respect to particular embodiments thereof, these particular embodiments are merely illustrative, and not restrictive. For instance, a system generating the dual timeline visualization may be as small a single user device that includes a data storage device, a processor, and a display. A tangible computer readable medium that stores an embodiment of the method for generating a dual timeline visualization may be as small as a local read-only memory (ROM) or random-access memory (RAM) in a user device.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method of generating a timeline visualization for comparing two datasets of chronologically ordered data, the method comprising:

retrieving first and second datasets from a data storage system, wherein the first dataset includes at least a first data item associated with a first time value and a first duration value and the second dataset includes at least a second data item associated with a second time value;

generating for display a first detail timescale including at least the first time value, wherein the first detail timescale covers a first time period and displays time units in a first direction;

generating for display a first item region, wherein the first item region is aligned with the first detail timescale;

generating for display a second detail timescale including at least the second time value, wherein the second detail timescale covers a second time period not a function of the first time period, and displays time units in the first direction;

generating for display a second item region, wherein the second item region is aligned with the second detail timescale;

generating for display in the first item region a first display object corresponding with the first data item, wherein the first display object includes a first display object position with respect to the first detail timescale based on the first time value and a size based on the first duration value, wherein the first display object extends from the first detailed timescale in a first direction perpendicular to a first axis of the first detailed timescale;

generating for display in the second item region a second display object corresponding with the second data item, wherein the second display object includes a second display object position with respect to the second detail timescale based on the second time value, wherein the second display object extends from the second detailed timescale in a second direction perpendicular to a second axis of the second detailed timescale;

forwarding the first and second detail timescales, the first and second item regions, and the first and second display objects to a user device adapted to display the timeline visualization;

generating for display an overview panel, including an overview timescale formed by collapsing the first data set and the second data set together, wherein the overview timescale is different than the first detail timescale and different than the second detail timescale, wherein the overview panel is responsive to a user scroll/resize input in the first direction, such that the overview panel is scrolled in the first direction without affecting display of the first and second detail timescales and the first and second item regions;

generating a lens portion of the overview panel whose duration matches a duration of at least the first detail timescale, wherein the lens portion is configured such that increasing and decreasing a size of the lens portion controls an increase or decrease of the level of detail within the first item region and the second item region;

removing detail from the first display object and the second display object to form a first marker and a second marker representing the first data item and second data item respectively;

displaying the first marker and the second marker within the overview panel, wherein:

a first marker position with respect to the overview timescale is based on the first time value;

a first marker size is based on the first duration value;

a second marker position with respect to the overview timescale is based on the second time value;

forwarding the overview panel to the user device adapted to display the overview panel;

retrieving a third dataset from the data storage system, wherein the third dataset includes at least a third data item associated with a third time value and a third duration value at least partially overlapping with the first time value and the first duration value, wherein the first display object corresponds with both the first and the third data item, and the first display object includes a visual indicator to show that it represents multiple data items; and receiving a user input unstack command to unstack the multiple data items represented by the first display object;

in response to receiving the user input unstack command performing the following acts:

reducing a contrast of the at least partially displayed first and second detail timescales, first and second item regions, and first and second display objects;

generating individual display objects corresponding to at least part of the multiple data items;

forwarding the individual display objects to the user device; and displaying the individual display objects with controls that allow navigation to any of the individual display objects.

2. The method of claim 1, wherein the first item region and the first detail timescale are responsive to a user scroll input in the first direction, such that the first item region and the first detail timescale scroll in unison in the first direction.

3. The method of claim 1, wherein the first item region and the first detail timescale are responsive to a user resize input in the first direction, such that the first item region and the first detail timescale resize in unison in the first direction.

4. The method of claim 1, wherein the first detail timescale is oriented horizontally.

5. The method of claim 1, wherein the first detail timescale is oriented vertically.

6. The method of claim 1, wherein the first item region is responsive to a user scroll input in a second direction, not aligned with the first detail timescale, such that the first item region scrolls in the second direction.

7. The method of claim 6, wherein the second item region is not responsive to the user scroll input in the second direction.

8. The method of claim 6, wherein the user scroll input in the second direction includes a selection of a user interface control associated with the first item region.

9. The method of claim 6, wherein the user scroll input in the second direction includes a touchscreen input gesture inside the first item region.

10. The method of claim 1, wherein the first display object includes a first color and the second display object includes a second color.

11. The method of claim 10, wherein the first display object is responsive to a user change color input, such that the first color can be set by the user.

12. The method of claim 10, wherein the first color is based on information included in the first dataset and the second color is based on information included in the second dataset.

13. The method of claim 1, wherein the user device excludes the data storage system.

14. The method of claim 1, wherein the user device includes the data storage system.

15. A system comprising the following hardware components ((a) through (d)):
   (a) an application server coupled with (b) a data storage device and adapted to receive requests from (c) a user device via (d) at least one network, wherein the application server is programmed to perform a method comprising:
   retrieving first and second datasets from the data storage system, wherein the first and second datasets each include chronologically ordered data, the first dataset includes at least a first data item associated with a first time value and a first duration value, and the second dataset includes at least a second data item associated with a second time value;
   generating for display a first detail timescale including at least the first time value, wherein the first detail timescale covers a first time period and displays time units in a first direction;
   generating for display a first item region, wherein the first item region is aligned with the first detail timescale;
   generating for display a second detail timescale including at least the second time value, wherein the second detail timescale covers a second time period not a function of the first time period, and displays time units in the first direction;
   generating for display a second item region, wherein the second item region is aligned with the second detail timescale;
   generating for display in the first item region a first display object corresponding with the first data item, wherein the first display object includes a first display object position with respect to the first detail timescale based on the first time value and a size based on the first duration value, wherein the first display object extends from the first detailed timescale in a first direction perpendicular to a first axis of the first detailed timescale;
   generating for display in the second item region a second display object corresponding with the second data item, wherein the second display object includes a second display object position with respect to the second detail timescale based on the second time value, wherein the second display object extends from the second detailed timescale in a second direction perpendicular to a second axis of the second detailed timescale;
   forwarding the first and second detail timescales, the first and second item regions, and the first and second display objects to the user device to display as a timeline visualization;
   generating for display an overview panel, including an overview timescale formed by collapsing the first data set and the second data set together, wherein the overview timescale is different than the first detail timescale and different than the second detail timescale, wherein the overview panel is responsive to a user scroll/resize input in the first direction, such that the overview panel is scrolled in the first direction without affecting display of the first and second detail timescales and the first and second item regions;
   generating a lens portion of the overview panel whose duration matches a duration of at least the first detail timescale, wherein the lens portion is configured such that increasing and decreasing a size of the lens portion generates an increase or decrease of a level of detail within the first item region and the second item region;
   removing detail from the first display object and the second display object to form a first marker and a second marker representing the first data item and second data item respectively, wherein:
   a first marker position with respect to the overview timescale is based on the first time value;
   a first marker size is based on the first duration value;
   a second marker position with respect to the overview timescale is based on the second time value;
   forwarding the overview panel to the user device adapted to display the overview panel;
   retrieving a third dataset from the data storage system, wherein the third dataset includes at least a third data item associated with a third time value and a third duration value at least partially overlapping with the first time value and the first duration value, wherein
   the first display object corresponds with both the first and the third data item and
   the first display object includes a visual indicator to show that it represents multiple data items; and
   receiving a user input unstack command to unstack the multiple data items represented by the first display object;
   in response to receiving the user input unstack command performing the following acts:

reducing a contrast of the at least partially displayed first and second detail timescales, first and second item regions, and first and second display objects;

generating individual display objects corresponding to at least part of the multiple data items;

forwarding the individual display objects to the user device; and displaying the individual display objects with controls that allow navigation to any of the individual display objects.

16. A tangible, non-transitory, computer-readable information storage medium including instructions adapted to direct a processor to perform a series of operations, the operations comprising:

retrieving first and second datasets from a data storage system, wherein the first dataset includes at least a first data item associated with a first time value and a first duration value and the second dataset includes at least a second data item associated with a second time value;

generating for display a first detail timescale including at least the first time value, wherein the first detail timescale covers a first time period and displays time units in a first direction;

generating for display a first item region, wherein the first item region is aligned with the first detail timescale;

generating for display a second detail timescale including at least the second time value, wherein the second detail timescale covers a second time period not a function of the first time period, and displays time units in the first direction;

generating for display a second item region, wherein the second item region is aligned with the second detail timescale;

generating for display in the first item region a first display object corresponding with the first data item, wherein the first display object includes a first display object position with respect to the first detail timescale based on the first time value and a size based on the first duration value, wherein the first display object extends from the first detailed timescale in a first direction perpendicular to a first axis of the first detailed timescale;

generating for display in the second item region a second display object corresponding with the second data item, wherein the second display object includes a second display object position with respect to the second detail timescale based on the second time value, wherein the second display object extends from the second detailed timescale in a second direction perpendicular to a second axis of the second detailed timescale;

forwarding the first and second detail timescales, the first and second item regions, and the first and second display objects to a user device to display as a timeline visualization;

generating for display an overview panel, including an overview timescale formed by collapsing the first data set and the second data set together, wherein the overview timescale is different than the first detail timescale and different than the second detail timescale, wherein the overview panel is responsive to a user scroll/resize input in the first direction, such that the overview panel is scrolled in the first direction without affecting display of the first and second detail timescales and the first and second item regions;

generating a lens portion of the overview panel whose duration matches a duration the first detail timescale, wherein the lens portion is configured such that increasing and decreasing a size of the lens portion controls an increase or decrease of a level of detail within the first item region and the second item region;

removing detail from the first display object and the second display object to form a first marker and a second marker representing the first data item and second data item respectively;

displaying the first marker and the second marker within the overview panel, wherein:

a first marker position with respect to the overview timescale is based on the first time value;

a first marker size is based on the first duration value;

a second marker position with respect to the overview timescale is based on the second time value;

forwarding the overview panel to the user device adapted to display the overview panel;

retrieving a third dataset from the data storage system, wherein the third dataset includes at least a third data item associated with a third time value and a third duration value at least partially overlapping with the first time value and the first duration value, wherein:

the first display object corresponds with both the first and the third data item and the first display object includes a visual indicator to show that it represents multiple data items; and receiving a user input unstack command to unstack the multiple data items represented by the first display object;

in response to receiving the user input unstack command performing the following acts:

reducing a contrast of the at least partially displayed first and second detail timescales, first and second item regions, and first and second display objects;

generating individual display objects corresponding to at least part of the multiple data items;

forwarding the individual display objects to the user device; and displaying the individual display objects with controls that allow navigation to any of the individual display objects.

* * * * *